Figure 1:
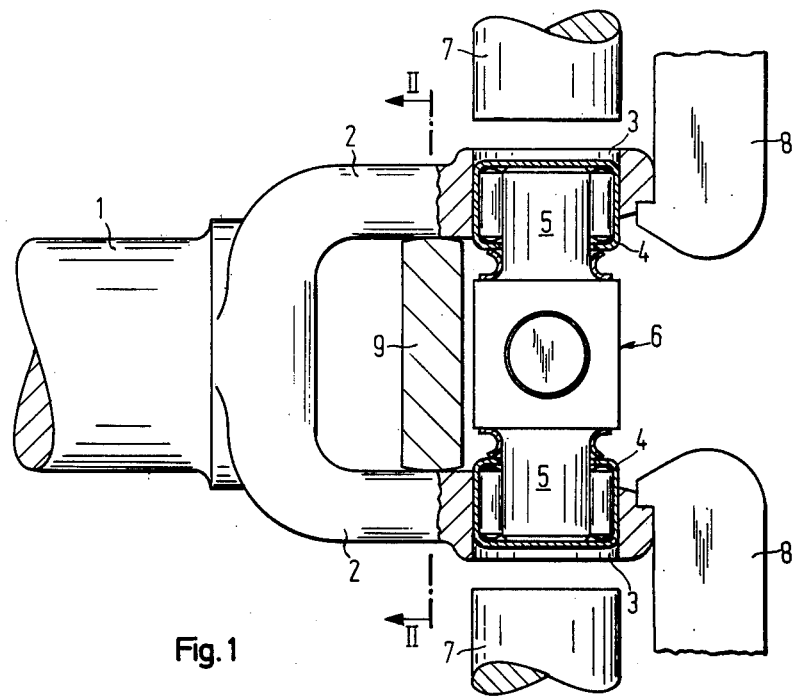

United States Patent [19]

Spiess

[11] 4,162,568
[45] Jul. 31, 1979

[54] APPARATUS FOR UNIVERSAL JOINT ASSEMBLY

[75] Inventor: Karl Spiess, Herzogenaurach, Fed. Rep. of Germany

[73] Assignee: Industriewerk Schaeffler OHG, Herzogenaurach, Fed. Rep. of Germany

[21] Appl. No.: 836,999

[22] Filed: Sep. 27, 1977

[30] Foreign Application Priority Data

Oct. 7, 1976 [DE] Fed. Rep. of Germany ....... 2645267

[51] Int. Cl.² ............................................. B25B 27/14
[52] U.S. Cl. ................................................. 29/281.3
[58] Field of Search ...................... 29/252, 283, 281.1, 29/281.3

[56] References Cited

U.S. PATENT DOCUMENTS

| 3,069,761 | 12/1962 | Sommer | 29/252 |
| 3,404,448 | 10/1968 | Schonfeld | 29/281.3 |
| 3,429,021 | 2/1969 | Spiess | 29/281.3 |
| 3,745,637 | 7/1973 | Rutherford et al. | 29/283 |

*Primary Examiner*—James L. Jones, Jr.
*Attorney, Agent, or Firm*—Hammond & Littell

[57] ABSTRACT

A novel apparatus for assembling universal joints formed by the connection of two shafts forked at their ends with a universal joint spider and having antifriction bearings arranged in opposite bores in the shaft forks for accommodating the spider trunnions by abutting against the end faces thereof in which the fork arms are supported at their free ends by holding clips or claws for absorbing the reaction force resulting from the pressing in or fixing force and/or for expansion by a predetermined amount relative to each other.

4 Claims, 2 Drawing Figures

APPARATUS FOR UNIVERSAL JOINT ASSEMBLY

STATE OF THE ART

Universal joints serve to establish an angular motion connection between two force-transmitting shafts. Universal joints are in great demand in large quantities for various uses, particularly in the automotive industry. Therefore, every effort is being made to mechanize as much as possible the assembly operations of these universal joints. With this purpose in view, a method has already been suggested to press-in the bearings which accommodate the spider trunnions in the bores of the fork arms with rams co-ordinated with each individual bearing and to accommodate the reaction force resulting from the pressing-in operation, the fork arms are connected by means of holding clips on the device producing the pressing-in force, so that no external forces will act on the fork arms. However, when the bearing is pressed in until it abuts in a play-free manner against the spider trunnion, the pressing-in force also acts on the spider trunnion, which in turn develops an external force, which acts on the bearing from the spider trunnion and acts oppositely to the pressing-in force.

Apparatus of this type is as a rule satisfactory, but in some instances, the fork arms of the universal joints are made especially thin and therefore weak to obtain as low weight or small mass of the universal joint. In this type of assembly, the fork arms are preferably provided with a cross-section profile so that the fork arms are very stiff in the circumferential direction in which they must absorb forces during operation while in the radial direction they are selectively flexible since they are under little load in this direction during operation.

In the assembly of universal joints of this type with known devices, this design of the fork arms has the disadvantage that support by the holding clips or claws alone is not sufficient and made the action of the pressing-in or fixing force on the fork arms, the arms undergo a sag or flexing despite the support of the holding clip which in some cases prevents a clearance-free assembly.

OBJECTS OF THE INVENTION

It is an object of the invention to provide a novel apparatus for assembling universal joints with thin fork arms with certain avoidance of sags or flexures to obtain a clearance-free assembly.

It is another object of the invention to provide a novel method of assembling universal joints with a shaft having thin fork arms in a clearance-free manner.

These and other objects and advantages of the invention will become obvious from the following detailed description.

THE INVENTION

The novel apparatus of the invention for assembling universal joints formed by the connection of two shafts forked at their ends with a universal joint spider and having anti-friction bearings arranged in opposite bores in the shaft forks for accommodating the spider trunnions comprising holding means to support the shaft fork arms at their free end and the absorbing reaction forces from the pressing-in force, and/or for expansion by predetermined amount relative to each other, means for pressing-in the bearings and support means engaging the fork arms at the sides of the bore opposite the holding means. In this manner, the fork arms are supported at two diametrically opposite parts of the bores so that bending of the fork arms is avoided with certainty.

An example of a supporting means of this type is a support member with lateral sides inclined toward each other in wedge form so that the member can be inserted into the space between the fork arms and in the final pressing-in position, its lateral sides abut against the fork arms with a predetermined force. The force with which the lateral faces of the support member applies against the fork arms must be sufficient to achieve a secure support and low enough to prevent the support member from exerting a bending stress on the fork arms.

The actuation of the support member may expediently be effected by a hydraulically or pneumatically pressurized cylinder thereby allowing an extremely sensitive adjustment of the force exerted on the support member.

Figure 2:
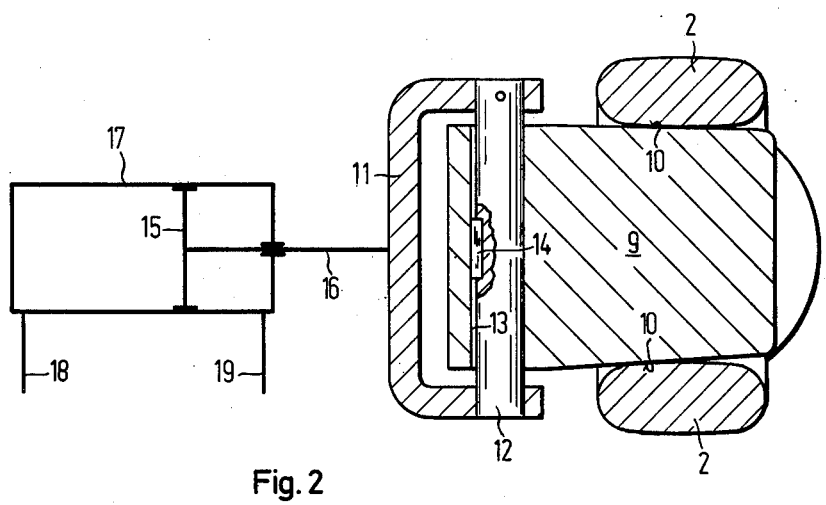

Referring now to the drawings:

FIG. 1 is a partial longitudinal cross-section through a universal joint during its assembly and FIG. 2 is a cross-sectional view of FIG. 1 taken along line II—II.

FIG. 1 illustrates the embodiment where shaft 1 is provided at its end with fork arms 2 provided with bores 3 adapted to receive antifriction bearing bushing 4 which holds needle bearings which support trunnions 5 of universal joint spider 6. The pressing-in or fixing of bushings 4 in bores 3 is provided by rams 7 and the fork arms 2 are supported at their ends by holding clips 8 which absorb the reaction force resulting from the pressure exerted by rams 7.

An additional support member 9 with lateral faces 10 inclined towards each other in wedge form is provided so that it comes into supporting contact with the inner sides of fork arms 2. FIG. 2 schematically shows the actuation of support member 9 which is mounted in yoke 11 so that it can shift to a certain degree along stud 12. However, rotation of member 9 relative to stud 12 is prevented by spring means 14 engaging groove 13. By this longitudinal displacement movement of support member 9 relative to stud 12, it is always assured that support member 9 will always lie flush against fork arms 2 with both lateral faces 10 even if fork arms 2 do not always occupy the exact same position in the apparatus due to manufacturing tolerances.

FIG. 2 further schematically illustrates that yoke 11 is connected to piston rod 16 connected to piston 15 which is mounted in cylinder 17 which can be pressurized with a hydraulic or pneumatic medium through lines 18 and 19. For inward movement of support member 9, cylinder 17 is pressurized by line 18 and after the assembly is completed, support member 9 is moved out of the supporting position by pressure admission through line 19.

Various modifications of the apparatus and method of the invention may be made without departing from the spirit or scope thereof and it should be understood that the invention is intended to be limited only as defined in the appended claims.

I claim:

1. An apparatus for assembling universal joints formed by the connection of two shafts forked at their ends with a universal joint spider and having anti-friction bearings arranged in opposite bores in the shaft forks for accommodating the spider trunnions comprising holding means for engaging each facing portion of the fork arms to support the fork arms of a shaft forked at its end at their free end and for absorbing reaction forces from the pressing-in force, means for pressing-in anti-friction bearings arranged in opposite bores in the shaft forks and support means for engaging the inner facing portions of the fork arms at the sides of the bore opposite the holding means.

2. The apparatus of claim 1 wherein the lateral faces of the support means are inclined towards each other in wedge form so that it is movable into the space between the fork ends and in the final position the lateral faces abut against the fork arms with a predetermined force.

3. The apparatus of claim 2 wherein movement of the support means is effected by a hydraulically pressurized cylinder.

4. The apparatus of claim 2 wherein movement of the support means is effected by a pneumatically pressurized cylinder.